United States Patent
Williamson (10) Patent No.: US 9,639,631 B2
(45) Date of Patent: May 2, 2017

(54) CONVERTING XML TO JSON WITH CONFIGURABLE OUTPUT

(71) Applicant: Cellco Partnership, Basking Ridge, NJ (US)

(72) Inventor: Victor L. Williamson, North Plainfield, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 754 days.

(21) Appl. No.: 13/779,052

(22) Filed: Feb. 27, 2013

(65) Prior Publication Data
US 2014/0244692 A1    Aug. 28, 2014

(51) Int. Cl.
| | | |
|---|---|---|
| G06F 7/00 | (2006.01) | |
| G06F 17/00 | (2006.01) | |
| G06F 17/30 | (2006.01) | |
| G06F 17/22 | (2006.01) | |
| G06F 17/27 | (2006.01) | |

(52) U.S. Cl.
CPC .... G06F 17/30923 (2013.01); G06F 17/2247 (2013.01); G06F 17/272 (2013.01)

(58) Field of Classification Search
CPC .................................................. G06F 17/30914
See application file for complete search history.

(56) References Cited

U.S. PATENT DOCUMENTS

| | | | | |
|---|---|---|---|---|
| 7,793,255 B1 * | 9/2010 | Kawaguchi | ............... | G06F 8/24 717/100 |
| 8,078,645 B2 * | 12/2011 | Singh | ............... | G06F 17/30327 707/802 |
| 8,104,044 B1 * | 1/2012 | Scofield | ................ | G06F 9/4443 709/203 |
| 9,128,912 B2 * | 9/2015 | Kamiya | ............... | G06F 17/2205 |
| 2004/0015840 A1 * | 1/2004 | Walker | .................... | G06F 9/465 717/108 |
| 2009/0059909 A1 * | 3/2009 | Sullivan | ................. | G06Q 10/06 370/360 |
| 2009/0070295 A1 * | 3/2009 | Otomori | ............. | G06F 17/2247 |
| 2009/0083313 A1 * | 3/2009 | Stanfill | ................. | G06F 9/4436 |

(Continued)

OTHER PUBLICATIONS

Jimmy Zhang; "Cut, Paste, split, and assemble XML documents with VTD-XML"; Jul. 24, 2006; JavaWorld; pp. 1-11.*

(Continued)

*Primary Examiner* — Mariela Reyes
*Assistant Examiner* — Jermaine Mincey (57) ABSTRACT

A device is configured to receive information that identifies an XML data structure, an input key including information that identifies an element in the XML data structure, and an output key including information that identifies a manner in which the element is to be identified in a JSON data structure. The device is configured to parse the XML data structure to determine an element identified by the input key, and generate the JSON data structure by storing an association between the element and the output key in the JSON data structure. The device is configured to populate the JSON data structure with content from the XML data structure, where the content is identified by the input key and is placed in a location in the JSON data structure identified by the output key. The device is configured to store the JSON data structure.

20 Claims, 7 Drawing Sheets

(56) References Cited

U.S. PATENT DOCUMENTS

| | | | |
|---|---|---|---|
| 2011/0119652 A1* | 5/2011 | Yu | G06F 9/4428 717/108 |
| 2011/0153630 A1* | 6/2011 | Vernon | G06F 17/30938 707/758 |
| 2011/0282969 A1* | 11/2011 | Iyer | G06F 17/3056 709/217 |
| 2014/0143252 A1* | 5/2014 | Silverstein | G06Q 10/105 707/737 |
| 2014/0207826 A1* | 7/2014 | Gao | G06F 17/30292 707/803 |

OTHER PUBLICATIONS

Kay, Michael. "A Streaming XSLT Processor." Presented at Balisage: The Markup Conference 2010, Montreal, Canada, Aug. 3-6, 2010. In *Proceedings of Balisage: The Markup Conference 2010.* Balisage Series on Markup Technologies, vol. 5 (2010), 21 pages.

"Web Services: JSON vs. XML," http://digitalbazaar.com/2010/11/22/json-vs-xml/, Nov. 22, 2010, 7 pages.

"JSON," Wikipedia, http://en.wikipedia.org/wiki/JSON#Native_encoding_and_decoding_in_browsers, Last Modified on Feb. 25, 2013, 11 pages.

"How to Convert Java Map to/From JSON (Jackson)," MKYong, www.mkyong.com/java/how-to-convert-java-map-to-from-json-jackson/, Aug. 11, 2011, 7 pages.

"About XStream," XStream, http://xstream.codehaus.org, Jan. 19, 2013, 2 pages.

"VTD-XML: The Future of XML Processing," http://vtd-xml.sourceforge.net/technical/O.html., Feb. 27, 2013 (Print Date), 1 page.

Kay, Michael. "A Streaming XSLT Processor." Presented at Balisage: The Markup Conference 2010, Montréal, Canada, Aug. 3-6, 2010. In *Proceedings of Balisage: The Markup Conference 2010.* Balisage Series on Markup Technologies, vol. 5 (2010), 21 pages.

Harold, Elliotte Rusty, "An Introduction to StAX," Sep. 17, 2003, http://www.xml.com/pub/a/2003/09/17/stax.html, 8 pages.

* cited by examiner

| Input Key 510 | Element Type 520 | Output Key 530 |
|---|---|---|
| /grocery/fruit/name | Literal | /items/name |
| /grocery | Object | /items |

CONVERTING XML TO JSON WITH CONFIGURABLE OUTPUT

BACKGROUND

Computer devices often transmit structured information over a network, such as a network between a server and a web application. The structured information may be exchanged and stored as text. The textual structured information may be formatted using a markup language, such as Extensible Markup Language (XML), or may be notated with JavaScript Object Notation (JSON).

DETAILED DESCRIPTION OF PREFERRED EMBODIMENTS

The following detailed description of example implementations refers to the accompanying drawings. The same reference numbers in different drawings may identify the same or similar elements.

Some users of computer devices (e.g., web developers) may prefer to structure information using a JSON data structure rather than an XML data structure. JSON maintains a number of advantages over XML, including greater simplicity, a better ability to map directly with modern programming languages, and a better format for information exchange. For these reasons, some users may wish to convert existing XML information, stored in an XML data structure, into JSON information, stored in a JSON data structure. However, converting an entire XML data structure into a JSON data structure may be time and processor intensive for users who wish to convert only a portion of the XML information into JSON information. Additionally, users may wish to rearrange the XML information. Implementations described herein may transform XML information, stored in an XML data structure, to JSON information, stored in a JSON data structure, and may produce any desired JSON output from selected parts of the XML information.

Figure 1:
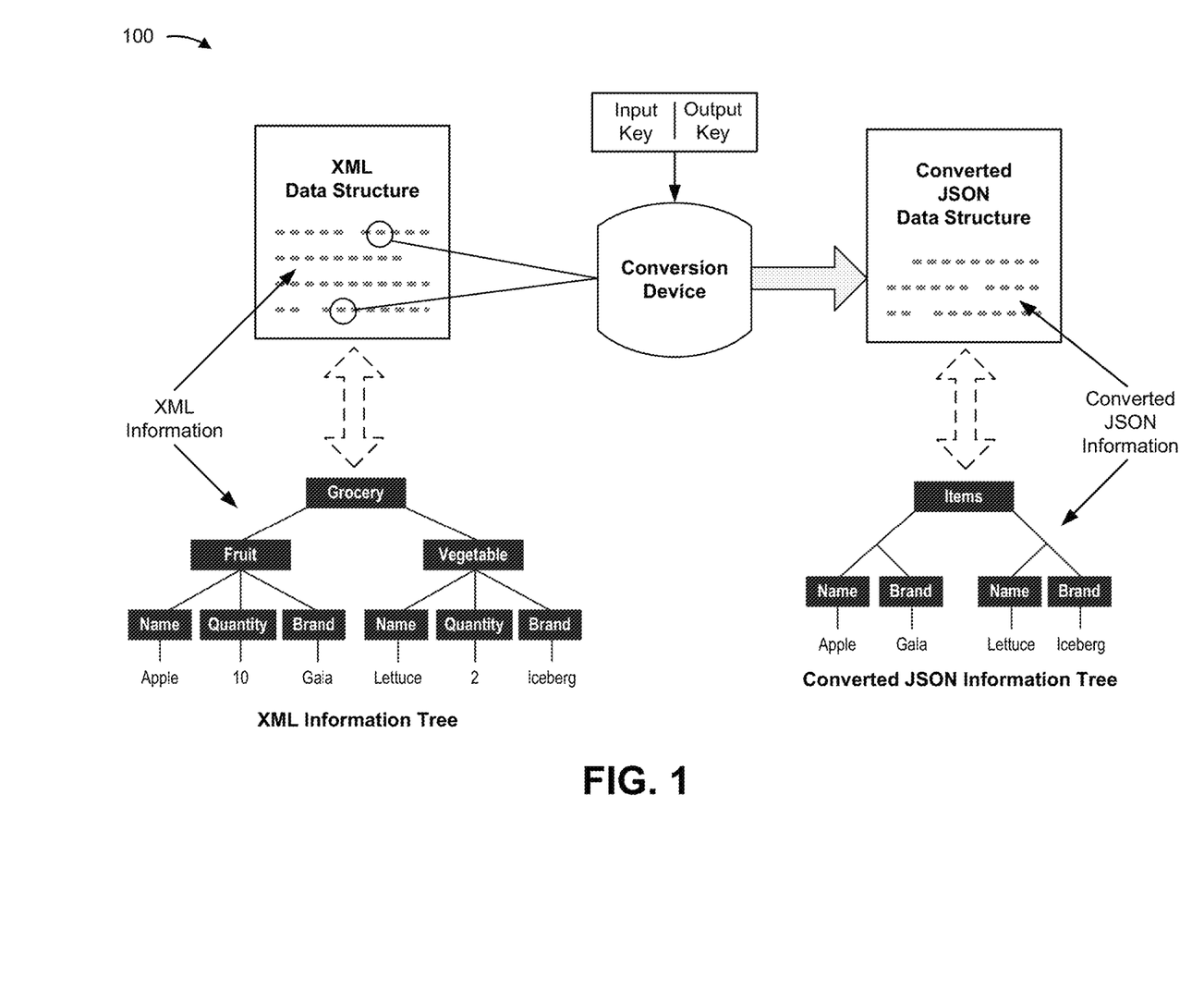
FIG. 1 is a diagram of an overview of an example implementation described herein.

FIG. 1 is a diagram of an example implementation 100 described herein. As shown in FIG. 1, example implementation 100 may include an XML data structure that stores XML information (e.g., in an XML information tree format), a conversion device, an input key, an output key, and a JSON data structure that stores converted JSON information (e.g., in a JSON information tree format).

As shown in FIG. 1, the XML information may be represented by the XML information tree. The XML information tree may identify how the XML information is arranged in the XML data structure. For example, the XML information may include information identifying a category, such as "Grocery," one or more sub-categories, such as "Fruit" and "Vegetable," and information corresponding to the name, quantity, and brand of particular items in each category and sub-category. The conversion device may receive information that identifies input keys identifying a subset of the XML information. For example, the input keys may identify certain elements of the XML information, such as "Grocery" elements, as well as the name and brand of particular items. The conversion device may parse the XML information, and may extract the elements identified by the input keys. XML information not identified by the input keys may not be converted into JSON. For example, if the input keys do not identify the "Quantity" element, then that element may not be converted into JSON.

As further shown in FIG. 1, the conversion device may receive information that identifies output keys. The output keys may identify how the converted JSON information is to be arranged in the JSON data structure, and/or may identify a manner in which XML information, converted from the XML data structure to the JSON data structure, is to be identified and/or structured in the JSON data structure. For example, the conversion device may output the extracted XML elements into the converted JSON information, and may arrange the JSON information according to the output keys. For example, the "Grocery" category in the XML information may be named "Items" in the converted JSON information, and the "Fruit" and "Vegetable" sub-categories of the XML information may also be included in the "Items" category of the converted JSON information. By processing information in this manner, the conversion device may convert XML information to JSON information in a manner capable of producing any desired JSON output from a selected subset of the XML information. Implementations described herein may allow users of computer devices to transform existing structured information into a format that is simpler, smaller, and better for information exchange.

Figure 2:
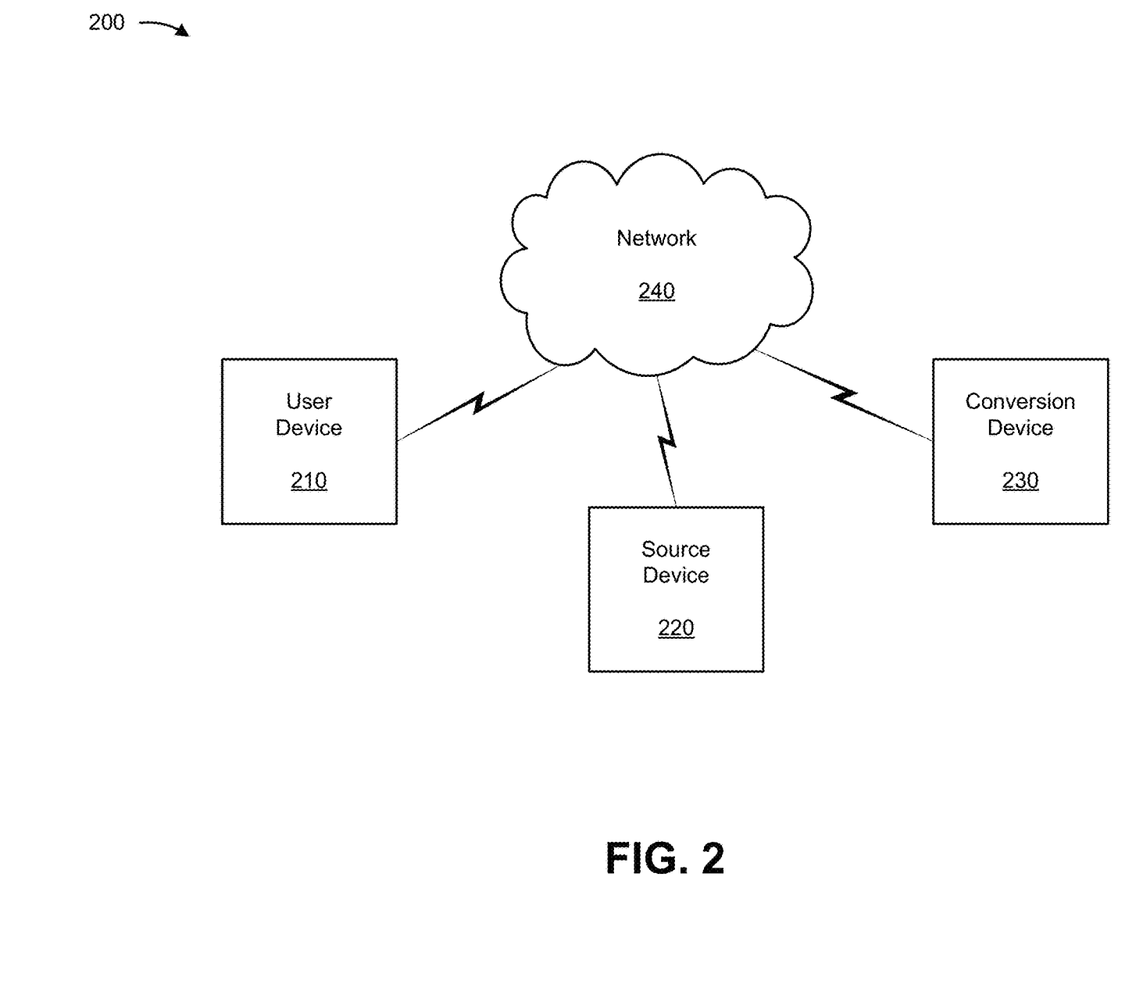
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a source device 220, a conversion device 230, and a network 240. Devices of environment 200 may interconnect via wired connections, wireless connections, or a combination of wired and wireless connections.

User device 210 may include a device capable of providing, receiving, processing, and/or displaying structured information. For example, user device 210 may include a computing device (e.g., a desktop computer, a laptop computer, a tablet computer, a handheld computer, etc.), a mobile phone (e.g., a smart phone, a radiotelephone, etc.), or a similar device. Structured information may refer to information structured according to a particular format or data scheme. For example, structured information may include information formatted according to a markup language, such as XML, or information notated in a JSON format. Structured information may be useful for storing and transmitting information, such as information shared between an Internet server and a web application. In some implementations, user device 210 may include a device capable of receiving user input (e.g., via a keypad, a keyboard, a touchscreen display, etc.). In some implementations, user device 210 may transmit structured information to and/or receive structured information from source device 220 and/or conversion device 230.

Source device 220 may include a device capable of providing, receiving, and/or processing structured information. For example, source device 220 may include a computing device, such as a server, a desktop computer, a laptop computer, a handheld computer, or a similar device. In some implementations, source device 220 may transmit structured information to and/or receive structured information from conversion device 230 and/or user device 210.

Conversion device 230 may include a device capable of converting structured information from one format to another. For example, conversion device 230 may include a computing device, such as a server, a desktop computer, a laptop computer, a handheld computer, or a similar device. In some implementations, conversion device 230 may receive an input key and/or an output key from user device 210. Additionally, or alternatively, conversion device 230 may receive structured information from source device 220. The input key may identify a portion of first structured information (e.g., XML information) that is to be converted to another format. The output key may identify how the first structured information (e.g., XML information) is to be arranged as second structured information (e.g., JSON information) after conversion.

Network 240 may include one or more wired and/or wireless networks. For example, network 240 may include a cellular network, a public land mobile network ("PLMN"), a second generation ("2G") network, a third generation ("3G") network, a fourth generation ("4G") network, a fifth generation ("5G") network, a long term evolution ("LTE") network, and/or another network. Additionally, or alternatively, network 240 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, any two or more of user device 210, source device 220, and/or conversion device 230 may be implemented within a single device or a collection of devices. Additionally, one or more of the devices of environment 200 may perform one or more functions described as being performed by another one or more devices of environment 200.

Figure 3:
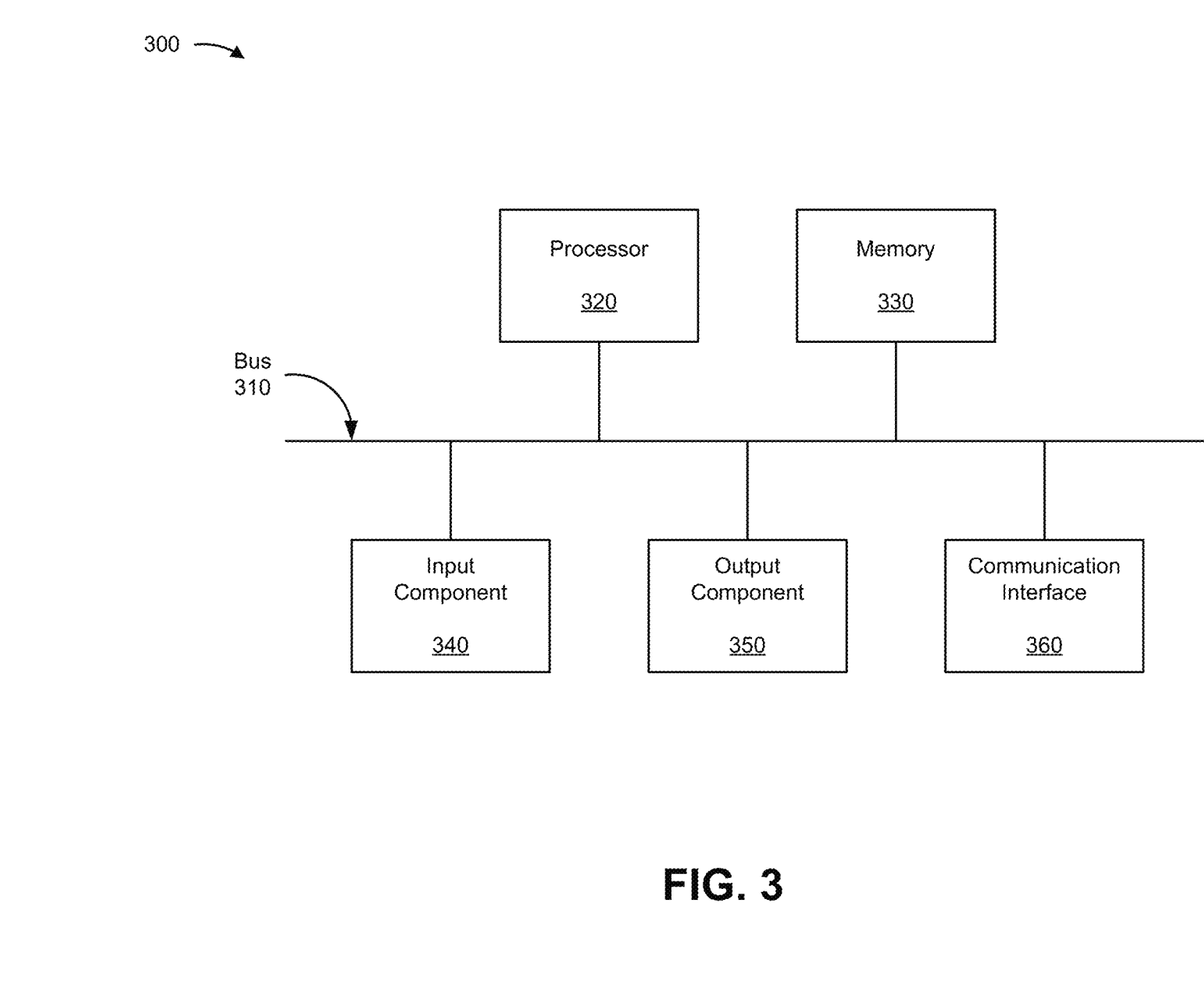
FIG. 3 is a diagram of example components of one or more devices of FIG. 2.

FIG. 3 is a diagram of example components of a device 300. Device 300 may correspond to user device 210, source device 220, and/or conversion device 230. Additionally, or alternatively, each of user device 210, source device 220, and/or conversion device 230 may include one or more devices 300 and/or one or more components of device 300. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, a communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
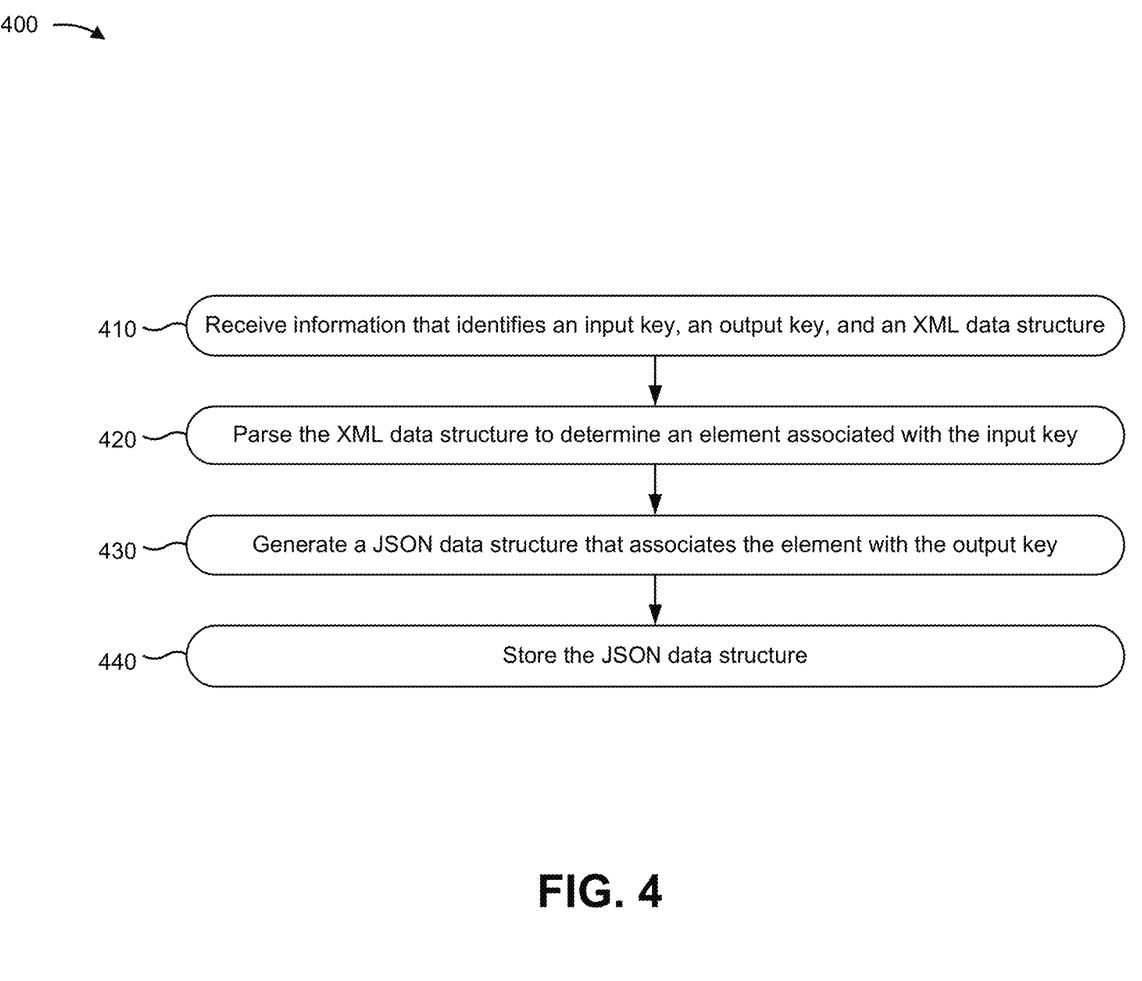
FIG. 4 is a flow chart of an example process for converting a portion of XML information, stored in an XML data structure, to JSON information, stored in a JSON data structure.

FIG. 4 is a flow chart of an example process 400 for converting a portion of XML information, stored in an XML data structure, to JSON information, stored in a JSON data structure. In some implementations, one or more process blocks of FIG. 4 may be performed by conversion device 230. Additionally, or alternatively, one or more process blocks of FIG. 4 may be performed by another device or a group of devices separate from or including conversion device 230, such as user device 210 and/or source device 220.

As shown in FIG. 4, process 400 may include receiving information that identifies an input key, an output key, and an XML data structure (block 410). For example, conversion device 230 may receive information that identifies the input key and the output key from user device 210, and may receive information that identifies the XML data structure from source device 220.

In some implementations, the input key may include information that identifies one or more elements in the structured information. An element may include a subset of structured information having a value and/or referenced by a key (e.g., an XML element, a JSON value, etc.). The value may include one or more characters denoted as content in the structured information (e.g., XML content, a JSON value, etc.). The value may include one or more characters, words, numbers, strings, objects, elements, arrays, or the like. The input key may include a marker identifying the value included in the structured information (e.g., an XML tag, a JSON key, etc.).

In some implementations, the input key may include information that identifies one or more XML elements in the XML information. For example, the input key may correspond to one or more XML tags identifying one or more XML elements. An XML element may include a subset of the XML information that includes a key (e.g., an XML tag) and/or a value (e.g., XML content). Additionally, or alternatively, the XML element may include one or more additional elements (e.g., child elements) within the XML element. An XML tag may include one or more characters identifying a start and/or an end of an element (e.g., a start tag, an end tag, etc.). Additionally, or alternatively, the input key may include information that identifies one or more attributes associated with one or more elements in the XML information. The attribute may include information that identifies a property associated with the XML element (e.g., information that identifies a font size for a font element, information that identifies an image source for an image element, etc.).

In some implementations, the output key may identify a manner in which the XML information, converted from the XML data structure to the JSON data structure, is to be identified and/or structured in the JSON data structure. For example, the output key may correspond to one or more keys (e.g., JSON keys) in a JSON object that identifies one or more values (e.g., JSON values) in the JSON information. The element (e.g., the JSON object) may include a number, a string, an object, an array, etc. The output key may identify how an element in the XML information (e.g., an XML element), identified by the input key, is identified and/or mapped in the JSON data structure after conversion.

In some implementations, the input keys and/or the output keys may identify the manner in which the structured information (e.g., the XML information, the JSON information, etc.) is structured. For example, the input keys and/or the output keys may indicate a hierarchical structure (e.g., a tree structure, an ordered tree, etc.) including a collection of nodes, where each node includes a value and a list of one or more other nodes (e.g., children). In this instance, the input keys and/or the output keys may indicate a top-level node (e.g., a root node), a second level node (e.g., a child of the top-level node), a third level node (e.g., a child of the second level node), and so forth.

In some implementations, the input keys and/or the output keys may be provided by a user, such as a user of user device 210. For example, a user of user device 210 may provide one or more input keys corresponding to XML elements of interest to the user. Additionally, or alternatively, the user of user device 210 may provide one or more output keys identifying how the one or more XML elements will be arranged and/or identified in the JSON data structure. In some implementations, the input keys and/or output keys may be selected automatically, such as by a computer device (e.g., a server, a desktop computer, a laptop, a handheld computer, etc.), a computer application (e.g., a web application, a computer program etc.), or the like. For example, the output keys may be generated automatically by a computer device based on information (e.g., XML tags) associated with the input keys.

The XML information may include any information (e.g., in a document, a file, a data structure, etc.) that is encoded or structured in an XML format. For example, the XML information may include information stored in a document, a file, and/or a data structure that is stored and/or transported for use associated with an Internet service, such as displaying a document in a web browser, sending and/or receiving requests from web services, or the like.

As further shown in FIG. 4, process 400 may include parsing the XML data structure to determine an element associated with the input key (block 420). For example, conversion device 230 may parse the XML data structure received from source device 220 to determine one or more elements associated with the one or more input keys received from user device 210. In some implementations, the element (e.g., an XML element) may include an element in the XML information (e.g., an XML element). The XML element may include a value (e.g., XML content) referenced by a key (e.g., an XML tag).

In some implementations, conversion device 230 may parse the XML data structure using a parsing module, such as a simple application programming interface for XML (SAX) parser. For example, conversion device 230 may parse the XML data structure by sequentially parsing one or more subsets of the XML data structure. For example, conversion device 230 may analyze the XML data structure, one element (e.g., one node, one object, one line, etc.) at a time, starting with the first element and proceeding, element-by-element, until the last element. When an element of interest is identified (e.g., based on matching an input key), the element may be converted to the JSON information. Additionally, or alternatively, elements that are not of interest (e.g., that do not match an input key) may not be converted to JSON information and/or may be ignored.

In some implementations, conversion device 230 may store one or more internal index keys that specify a parsing location in the XML data structure. While parsing the XML data structure, conversion device 230 may compare the internal index keys to the input keys. When an internal index key matches an input key, conversion device 230 may select an element associated with the internal index key (and the matching input key). Conversion device 230 may add the selected element to the JSON data structure along with the associated output key (e.g., that maps to the input key associated with the selected element). Additionally, or alternatively, conversion device 230 may add the selected element to a data structure, such as an intermediate map, before the selected element is added to the JSON data structure.

As further shown in FIG. 4, process 400 may include generating a JSON data structure that associates the element with the output key (block 430). For example, conversion device 230 may generate a JSON data structure that associates the element with the output keys received from user device 210.

In some implementations, conversion device 230 may generate JSON information based on the input keys and the output keys. For example, conversion device 230 may identify an element (e.g., an XML element) identified by an input key (e.g., "/brand") while parsing the XML information. The XML element may include an XML start tag (e.g., "<brand>"), an XML end tag (e.g., "</brand>"), and XML content (e.g., "Gala"). Conversion device 230 may modify the XML element by changing the key (e.g., the XML tag) associated with the XML element to a key (e.g., a JSON key) to be joined with a JSON object. For example, the input key (e.g., "/brand") may correspond to an output key (e.g., "/description"), and conversion device 230 may change the XML tag ("<brand>") identified by the input key (e.g., "/brand") to the JSON key (e.g., "{description:") based on the output key (e.g., "/description").

Conversion device 230 may populate the JSON data structure with one or more values (e.g., XML content) identified by the input keys by associating the values with the output keys. For example, the value (e.g., "Gala") identified by the input key (e.g., "/brand") in the XML information may be associated with the JSON key (e.g., "{description:") identified by the output key (e.g., "/description"). Thus the XML element:
<brand>Gala</brand>
identified by the input key is converted to the JSON object:
{description: "Gala"}
identified by the output key.

In some implementations, conversion device 230 may associate the element of the XML information (e.g., the XML element) with the output key by use of an intermediate map. The intermediate map may be a data structure that includes elements identified (e.g., based on the input keys) while parsing the XML data structure, and information identifying where the elements are to be placed and/or how the elements are to be identified and/or structured in the JSON data structure. Additionally, or alternatively, the intermediate map may include a data structure capable of mapping a value (e.g., XML content) to a key (e.g. a JSON key) by use of an associative array (e.g., a hash table, a hash map, etc.).

In some implementations, the intermediate map may include information identifying a portion of the XML data structure to be converted into the JSON data structure. For example, the intermediate map may include the input keys. The intermediate map may also include information output during the parsing process (e.g., SAX output). For example, the intermediate map may include information, such as an output key, identifying how the element (e.g., the XML elements) should be identified and/or structured (e.g., where the element should be placed) in the JSON data structure. In some implementations, the intermediate map may include information identifying an element type (e.g., an object, a literal, etc.). In some implementations, conversion device 230 may use the element type to determine whether the element extracted from the XML data structure is to be included in the JSON data structure.

In some implementations, conversion device 230 may generate the JSON data structure by analyzing the information in the intermediate map. For example, conversion device 230 may examine each element extracted from the XML data structure identified from the input keys to determine whether the element is of the element type identified in the intermediate map. If the element is of the proper element type, conversion device 230 may include the element in the JSON data structure. If the element is not of the proper element type, conversion device 230 may not include the element in the JSON data structure. Conversion device 230 may place and/or identify the element in the JSON data structure according to the output key.

In some implementations, conversion device 230 may generate the JSON data structure without the use of an intermediate map. For example, conversion device 230 may use a non-extractive parser to retrieve one or more elements in the XML data structure, and may use string manipulation to incrementally generate the JSON information. For example, conversion device 230 may use a virtual token descriptor for extensible markup language (VTD-XML) parser to retrieve one or more elements in the XML data structure. The VTD-XML parser may encode an offset (e.g., a value indicating a displacement from the beginning of the XML data structure to the XML element), a length (e.g., an XML element length), and an element type (e.g., an XML element type) associated with the node in 64-bit integers. Conversion device 230 may use the VTD-XML parser to retrieve specific elements (e.g., XML elements) in the XML information, and may incrementally modify the elements to generate JSON objects.

As further shown in FIG. 4, process 400 may include storing the JSON data structure (block 440). For example, conversion device 230 may store the JSON data structure in a memory device (e.g., a RAM, a hard disk, etc). Additionally, or alternatively, conversion device 230 may provide the JSON data structure to user device 210 and/or source device 220. In some implementations, conversion device 230 may provide the JSON data structure by streaming the JSON data structure. Streaming may include providing the JSON data structure as the XML data structure is being parsed, and/or as the intermediate map is being generated (e.g., before parsing and/or generation is completed). Additionally, or alternatively, conversion device 230 may provide the JSON data structure after the XML data structure has been parsed.

In some implementations, the JSON data structure, provided to user device 210 and/or source device 230, may be used in Internet applications. For example, user device 210 and/or source device 230 may use the JSON data structure to display a document (e.g., a file, a web page, etc.) in a web browser, and/or to send and/or receive requests from a web service (e.g., an application server). Additionally, or alternatively, user device 210 and/or source device 230 may use the JSON data structure to publish and/or update web pages and/or web applications with new content (e.g., blog entries, news headlines, video clips, etc.) via rich site summary (RSS).

While a series of blocks has been described with regard to FIG. 4, the blocks and/or the order of the blocks may be modified in some implementations. Additionally, or alternatively, non-dependent blocks may be performed in parallel.

Figure 5:
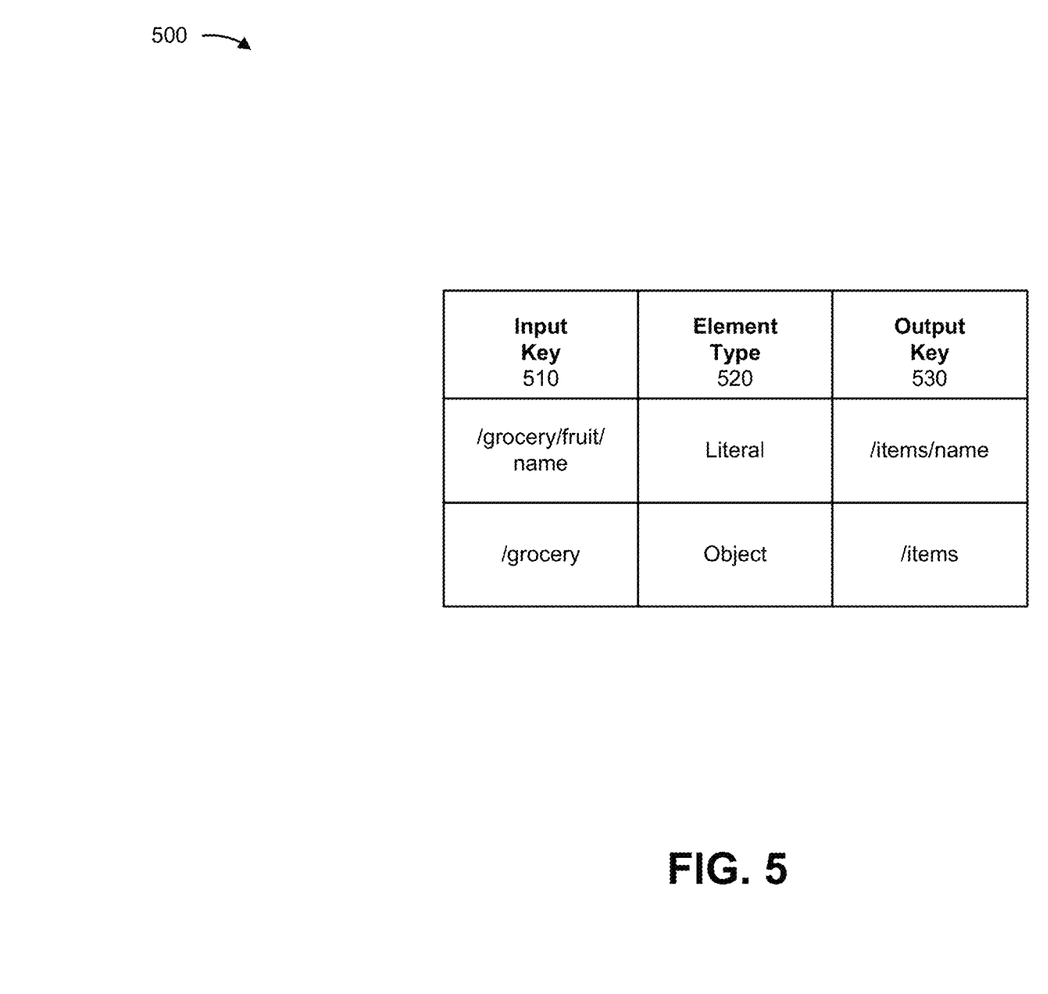
FIG. 5 is a diagram of an example data structure that stores an intermediate map.

FIG. 5 is a diagram of an example data structure 500 that stores an intermediate map. Data structure 500 may be stored in a memory device (e.g., a RAM, a hard disk, etc.), associated with one or more devices and/or components shown in FIGS. 2 and/or 3. For example, data structure 500 may be stored by conversion device 230.

Data structure 500 may include a collection of fields, such as an input key field 510, an element type field 520, and an output key field 530.

Input key field 510 may store information that identifies one or more input keys (e.g., input keys received from user device 210). The input keys may identify one or more elements in the XML data structure (e.g., received from source device 220). For example, the information may include one or more XML tags identifying one or more XML elements in the XML data structure. Additionally, or alternatively, input key field may store information that identifies one or more attributes associated with one or more XML elements in the XML data structure.

In some implementations, the input key may identify the manner in which the XML information is structured. For example, the input key may indicate a top-level element (e.g., "grocery"), one or more second level elements (e.g., "fruit," "vegetable"), one or more third level elements (e.g., "name," "quantity," "brand"), etc.

Element type field 520 may store information identifying an element type associated with the input key identified in input key field 510. In some implementations, the information may include a string of characters, such as numbers, letters, and/or symbols, that identify an element type. The element type may refer to an object (e.g., a list, an array, etc.) and/or a literal (e.g., a fixed value, a number, a string, etc.). Additionally, or alternatively, the element type may include information identifying an attribute associated with an element.

In some implementations, conversion device 230 may analyze the information stored in input key field 510 (e.g., information identifying an element extracted from the XML data structure) to determine an expected element type associated with the information (e.g., whether the element is expected to be a list, an array, a number, a string, etc.). Element type field 520 may store information identifying the expected element type. Additionally, or alternatively, as conversion device 230 parses the XML information, conversion device 230 may analyze an element to determine an element type associated with the element. Conversion device 230 may determine whether the element type matches the expected element type determined from input key field 510 and stored in element type field 520. If the element type matches the expected element type, conversion device 230 may convert the value (e.g., the XML content) associated with the element to JSON information. If the element type does not match the expected element type, conversion device 230 may ignore the value (e.g., the XML content) associated with the element.

Output key field 530 may store information that identifies one or more output keys to be used to identify, in the JSON data structure, elements identified, in the XML data structure, by the input key identified by input key field 510. For example, the output keys may identify how the converted JSON information is to be arranged in the JSON data structure, and/or may identify a manner in which the XML information, converted from the XML data structure to the JSON data structure, is to be identified and/or structured in the JSON data structure.

In some implementations, the information may be a string of characters, such as numbers, letters, and/or symbols. After analyzing the information in input key field 510 and element type field 520, and determining that an element identified in input key field 510 is to be included in the JSON data structure, conversion device 230 may include the element in the JSON data structure based on the output key. For example, an element (e.g., an XML element) identified by the input key (e.g., "/grocery/fruit/name") that correctly matches the element type identified in element type field 520 (e.g., "Literal"), may be placed in the JSON data structure according to the location identified in output key field 530 (e.g., "/items/name"). In this instance, a value, "Apple," may be arranged in the XML information as XML content identified by an XML tag (e.g., "name") associated with a parent element, "Fruit." In the JSON data structure, however, the value, "Apple," may be rearranged to be included in a parent element (e.g., JSON object) named "Items."

Information associated with a single input key may be conceptually represented as a row in data structure 500. For example, the first row in data structure 500 may correspond to an input key of "/grocery/fruit/name." An element type of "literal" may correspond to the expected element type identified by the input key "/grocery/fruit/name." As conversion device 230 parses the XML information, conversion device 230 may analyze an element, "Apple," identified by the input key "/grocery/fruit/name," and may determine that the element type (e.g., a string of characters) associated with "Apple" matches the expected element type of "literal." Based on this determination, conversion device may output the element "Apple" into the JSON data structure under the output key "/items/name."

Data structure 500 includes fields 510-530 for explanatory purposes. In practice, data structure 500 may include additional fields, fewer fields, different fields, or differently arranged fields than those illustrated in FIG. 5 and/or described herein with respect to data structure 500. Furthermore, while data structure 500 is represented as a table with rows and columns, in practice, data structure 500 may include any type of data structure, such as a linked list, a tree, a hash table, a database, or any other type of data structure. In some implementations, data structure 500 may include information generated by a device and/or component. Additionally, or alternatively, data structure 500 may include information provided from another source, such as information provided by a user, and/or information automatically provided by a device.

Figure 6A:
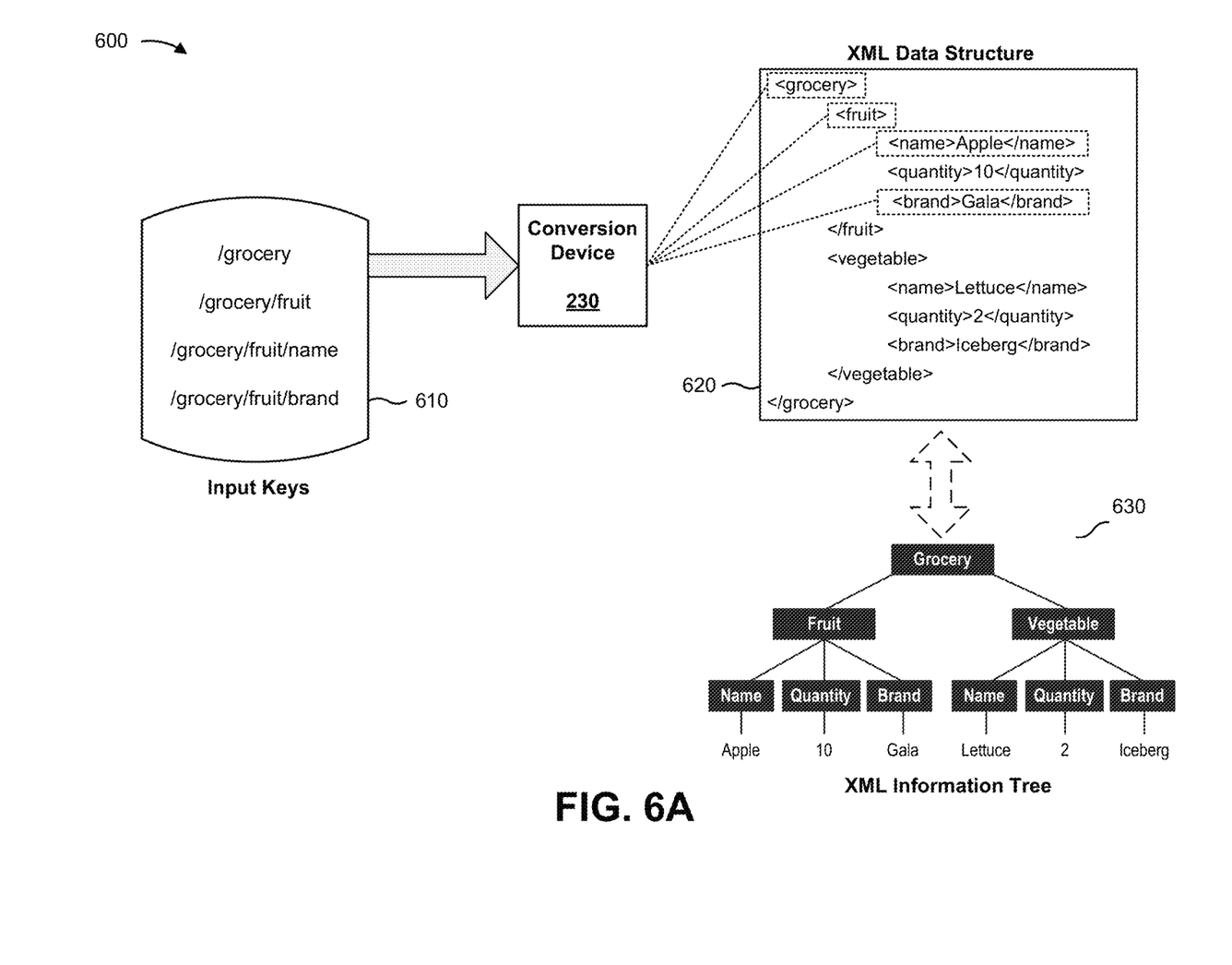
FIGS. 6A and 6B are diagrams of an example implementation relating to the example process shown in FIG. 4.
Figure 6B:
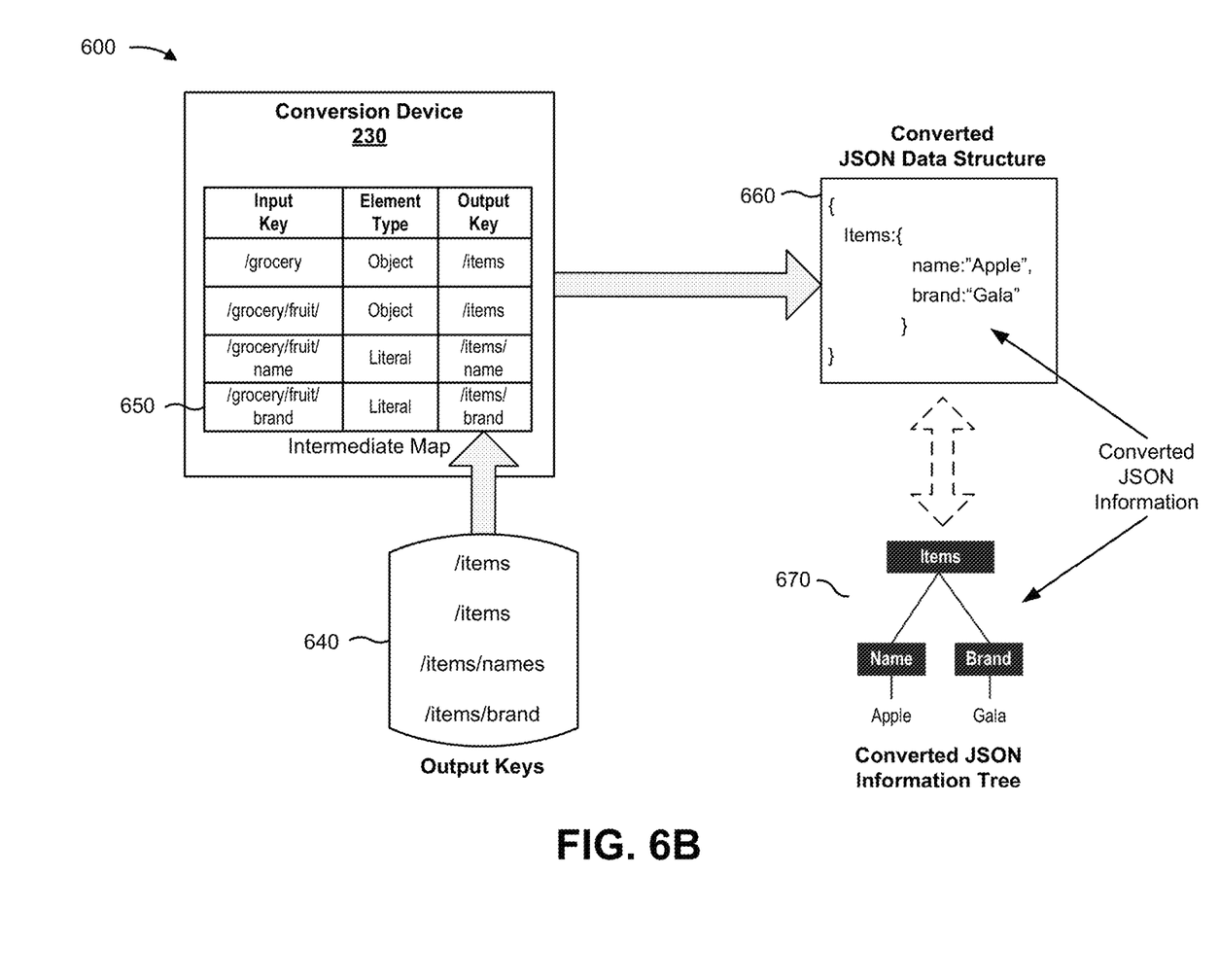

FIGS. 6A and 6B are diagrams of an example implementation 600 relating to process 400 (FIG. 4). In example implementation 600, conversion device 230 may receive one or more input keys, one or more output keys, and XML information, stored in an XML data structure. The input keys may identify a portion of the XML data structure to convert to a JSON data structure. Conversion device 230 may parse the XML data structure and extract one or more elements identified by the input key. Conversion device 230 may generate an intermediate map, from which conversion device 230 may use the output keys to generate the JSON data structure.

As shown in FIG. 6A, conversion device 230 may receive one or more input keys identifying a portion of the XML data structure to convert to JSON information. In some implementations, the input keys may include information identifying one or more keys (e.g., XML tags) and/or one or more elements (e.g., XML elements) of XML information stored in the XML data structure. As shown by reference number 610, the input keys may include information corresponding to a list of grocery items. Based on the input keys, conversion device 230 may parse the XML data structure and identify XML information that is to be converted to JSON information.

As shown by reference number 620, the XML data structure may store XML information relating to a list of grocery items structured in an XML format. The XML data structure may include one or more XML tags (e.g., "<name>" and "</name>") that identify XML content (e.g., "Apple"). As shown by reference number 630, an XML information tree may show how the XML data structure is structured into a parent node (e.g., "Grocery") and one or more child nodes (e.g., "Fruit," "Vegetable," etc.).

As shown in FIG. 6A, conversion device 230 may identify certain tags and/or elements in the XML data structure based on the input keys. For example, the input key "/grocery" may correspond to the XML tags "<grocery>" and/or "</grocery>" in the XML data structure, which may correspond to the "Grocery" parent node in the XML information tree. The input key "/grocery/fruit" may correspond to the XML tags "<fruit>" and/or "</fruit>" in the XML data structure, which may correspond to the "Fruit" child node in the XML information tree. The input key "/grocery/fruit/name" may correspond to the XML tags "<name>" and/or </name>" in the XML information, which may correspond to the "Name" grandchild node in the XML information tree. The input key "/grocery/fruit/brand" may correspond to the XML tags "<brand>" and/or "</brand>" in the XML information, which may correspond to the "Brand" grandchild node in the XML information tree.

In some implementations, conversion device 230 may parse the XML information sequentially. For example, conversion device 230 may begin with a first XML tag (e.g., "<grocery>") and proceed until the last XML tag (e.g., "</grocery>"). When an element of interest is identified (e.g., an element that matches an input key), the element may be stored in the intermediate map and/or converted to JSON information. Additionally, or alternatively, conversion device 230 may select only a subset of the XML information based on the input keys. As shown in FIG. 6A, the input keys do not include information corresponding to the "Vegetable" node, or information associated with the "Vegetable" node (e.g., "Lettuce," "2," and "Iceberg"). Information not identified by the input keys may not be converted to JSON information.

As shown in FIG. 6B, conversion device 230 may receive one or more output keys identifying JSON information in the JSON data structure. Conversion device 230 may generate an intermediate map including the input keys, one or more element types associated with the input keys, and the output keys.

As shown by reference number 640, conversion device 230 may receive one or more output keys. The output keys may include information that identifies a manner in which a value (e.g., XML content), extracted from the XML data structure, is to be identified and/or structured in the JSON data structure. For example, the output key may include a key (e.g., "/items") associated with the XML tag, "<grocery>," identified by the input key, "/grocery."

In some implementations, conversion device 230 may use an intermediate map to associate the XML elements of the XML data structure with the output keys. As shown by reference number 650, conversion device 230 may generate an intermediate map, which may correspond to data structure 500 (FIG. 5). The intermediate map may include the input key (e.g., "/grocery") and an expected XML element type associated with the input key (e.g., "Object"). While parsing the XML information, conversion device 230 may analyze the XML element associated with the input key (e.g., "/grocery") to determine whether the XML element is of the same XML element type (e.g., "Object") associated with the input key. The intermediate map may store information identifying the XML element (e.g., that matches the element type) associated with the input key. Additionally, the intermediate map may store the output keys identifying a location where the XML element is to be placed in the JSON data structure.

In some implementations, conversion device 230 may generate the JSON data structure based on the intermediate map. For example, conversion device 230 may associate the value (e.g., the XML content associated with the input key) with the output key to determine a location, in the JSON data structure, at which the value is to be placed. As shown in FIG. 6B, the XML element "/grocery" is to be represented in the JSON information as "/items."

As shown by reference number 660, the JSON data structure may include information converted from the XML data structure. The JSON data structure may include one or more JSON keys (e.g., "name," "brand," etc.), based on the output keys, and one or more JSON values (e.g., "Apple," "Gala," etc.) associated with the JSON keys, determined by parsing the XML data structure using the input keys.

As shown by reference number 670, a JSON information tree corresponding to the JSON data structure may show how the JSON information is structured into parent nodes (e.g., "Items") and child nodes (e.g., "Name," "Brand"). A comparison to the XML information tree (reference number 630, FIG. 6A) shows that the XML information has been rearranged during the conversion process. For example, the parent node labeled as "Grocery" in the XML information tree is called "Items" in the JSON information tree. The information associated with the child node "Vegetable" in the XML information tree has been eliminated from the JSON information tree. Additionally, the grandchild node "Quantity" in the XML information tree has been eliminated from the "Fruit" child node in the JSON information tree.

Implementations described herein may convert XML information, stored in an XML data structure, to JSON information, stored in a JSON data structure, and may produce any desired JSON output from selected parts of the XML information.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Implementations described herein may relate to structured information, such as XML information and JSON information. As used herein, structured information may refer to information that has been arranged, organized, and/or classified. Structured information may include information that identifies, describes, and/or annotates one or more aspects of other information (e.g., metadata, metecontent, etc.). In some implementations, structured information may include hypertext markup language (HTML), extensible hypertext markup language (XHTML), cascading style sheets (CSS), TeX, LaTeX, or the like.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more times, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device comprising:
   one or more processors to:
   receive information that identifies an input key, an output key, and an extensible markup language (XML) data structure, the input key including information that identifies an element in the XML data structure, the output key including information that identifies a manner in which the element is to be identified in a JavaScript object notation (JSON) data structure, and the element being arranged in a first hierarchical structure in the XML data structure;

parse the XML data structure to determine the element identified by the input key;

store the element, identified by the input key, in an intermediate map based on parsing the XML data structure, the intermediate map including a type associated with the element;

store, in the intermediate map, an association between the element, identified by the input key, and the output key;

selectively generate the JSON data structure, using the intermediate map, based on determining whether content from the XML data structure is of an element type identified in the intermediate map, the JSON data structure being populated with the content based on determining that the content is of the element type identified in the intermediate map, the content being identified by the input key and being placed in a location in the JSON data structure identified by the output key, and the content being included in a second hierarchical structure in the JSON data structure, the first hierarchical structure being different than the second hierarchical structure, the JSON data structure not being populated with the content based on determining that the content is not of the element type identified in the intermediate map, and a non-extractive parser being used when the JSON data structure is generated without using the intermediate map; and store the JSON data structure.

2. The device of claim 1, where the input key includes an XML tag identifying a start or an end of the element.

3. The device of claim 1, where the element includes at least one of:
a start tag;
an end tag;
an empty element tag; or
XML content identified by the start tag or the end tag.

4. The device of claim 1, where the one or more processors, when receiving information that identifies the input key and the output key, are to:
receive information that identifies the first hierarchal structure, and
receive information that identifies the second hierarchal structure, and
where the one or more processors are further to:
populate the JSON data structure based on the second hierarchal structure.

5. The device of claim 1, where the one or more processors are further to:
receive information that identifies an expected element type associated with the input key;
compare the type, associated with the element, to the expected element type to form a comparison result; and
populate the JSON data structure based on the comparison result.

6. The device of claim 1, where the one or more processors, when parsing the XML data structure, are to:
parse the XML data structure one element at a time, and
where the one or more processors are further to:
store associations between each element of the XML data structure and a corresponding output key as the XML data structure is parsed.

7. The device of claim 1, where the type associated with the element indicates whether the element is an object, a literal, a word, a number, a string, a list, or an array.

8. A non-transitory computer-readable medium storing instructions, the instructions comprising:
one or more instructions that, when executed by one or more processors, cause the one or more processors to:
receive information that identifies an input key, an output key, and an extensible markup language (XML) data structure, the input key including information that identifies an element in the XML data structure, the output key including information that identifies a manner in which the element is to be identified in a JavaScript object notation (JSON) data structure, and the element being in a first hierarchical structure in the XML data structure;

parse the XML data structure to determine content identified by the input key;

store the element in an intermediate map based on parsing the XML data structure, the intermediate map including a type associated with the element;

selectively generate the JSON data structure, using the intermediate map, based on determining whether content from the XML data structure is of an element type identified in the intermediate map, the JSON data structure being populated, in a location identified by the output key, with the content based on determining that the content is of the element type identified in the intermediate map, the location being in a second hierarchical structure in the JSON data structure, the first hierarchical structure being different than the second hierarchical structure, the JSON data structure not being populated, in the location identified by the output key, with the content based on determining that the content is not of the element type identified in the intermediate map, and a non-extractive parser being used when the JSON data structure is generated without using the intermediate map; and store the JSON data structure.

9. The non-transitory computer-readable medium of claim 8, where the input key includes an XML tag identifying a start or an end of the element.

10. The non-transitory computer-readable medium of claim 8, where the element includes at least one of:
a start tag;
an end tag;
an empty element tag; or
XML content identified by the start tag or the end tag.

11. The non-transitory computer-readable medium of claim 8, where the one or more instructions, that cause the one or more processors to receive the information that identifies the input key and the output key, cause the one or more processors to:

receive information that identifies the first hierarchal structure,
another element, in the XML data structure, being arranged in the first hierarchical structure, and
receive information that identifies the second hierarchal structure, and
where the one or more instructions, when executed by the one or more processors, further cause the one or more processors to:
populate the JSON data structure based on the second hierarchal structure,
the JSON data structure excluding the other element.

12. The non-transitory computer-readable medium of claim 8, where the one or more instructions, that cause the one or more processors to parse the XML data structure, cause the one or more processors to:
parse the XML, data structure one element at a time, and
store an association between the element and the output key as the XML data structure is parsed.

13. The non-transitory computer-readable medium of claim 8, where
the type indicates whether the element is an object, a literal, a word, a number, a string, a list, or an array.

14. A method, comprising:
receiving, by a device, information that identifies an input key, an output key, and an extensible markup language (XML) data structure,
the input key including information that identifies an element in the XML data structure,
the output key including information that identifies a manner in which the element is to be identified in a JavaScript object notation (JSON) data structure, and
the element being arranged in a first hierarchical structure in the XML data structure;
parsing, by the device, the XML data structure to determine the element identified by the input key;
storing, by the device, the element, identified by the input key, in an intermediate map based on parsing the XML data structure,
the intermediate map including a type associated with the element;
selectively creating, by the device, the JSON data structure, using the intermediate map, based on determining whether content from the XML data structure is of an element type identified in the intermediate map,
the JSON data structure including hierarchical elements, of a second hierarchical structure, created based on the input key and the output key,
the JSON data structure being populated with the content from the XML data structure based on determining that the content from the XML data structure is of the element type identified in the intermediate map,
the content being identified by the input key and being placed in a location in the JSON data structure identified by the output key, and
the content being included in the second hierarchical structure in the JSON data structure,
the JSON data structure not being populated with the content from the XML data structure based on determining that the content from the XML data structure is not of the element type identified in the intermediate map, and
a non-extractive parser being used when the JSON data structure is created without using the intermediate map; and
storing, by the device, the JSON data structure.

15. The method of claim 14, where the input key includes an XML tag identifying a start or an end of the element.

16. The method of claim 14, where the element includes at least one of:
a start tag;
an end tag;
an empty element tag; or
XML content identified by the start tag or the end tag.

17. The method of claim 14, further comprising:
receiving information that identifies an expected element type associated with the input key;
comparing an element type of the element to the expected element type to form a comparison result; and
populating the JSON data structure based on the comparison result.

18. The method of claim 14, where parsing the XML data structure comprises:
parsing the XML data structure one element at a time; and
where selectively creating the JSON data structure comprises:
selectively creating the JSON data structure as the XML data structure is parsed.

19. The method of claim 14, where the type associated with the element indicates whether the element is an object, a literal, a word, a number, a string, a list, or an array.

20. The non-transitory computer-readable medium of claim 8, where the content is a first content;
where the one or more instructions, when executed by the one or more processors, further cause the one or more processors to:
receive information that identifies an expected element type associated with the input key;
compare an element type of a second content with the expected element type; and
exclude the second content from the XML data structure based on the element type of the second content not matching the expected element type.

* * * * *